(12) United States Patent
Liang

(10) Patent No.: US 7,794,793 B2
(45) Date of Patent: Sep. 14, 2010

(54) CARBON NANOTUBE ARRAYS FOR FIELD ELECTRON EMISSION AND METHODS OF MANUFACTURE AND USE

(75) Inventor: Kangning Liang, Bartlett, TN (US)

(73) Assignee: Brother International Corporation, Bridgewater, NJ (US)

( * ) Notice: Subject to any disclaimer, the term of this patent is extended or adjusted under 35 U.S.C. 154(b) by 0 days.

(21) Appl. No.: 11/949,564

(22) Filed: Dec. 3, 2007

(65) Prior Publication Data

US 2008/0305248 A1     Dec. 11, 2008

Related U.S. Application Data

(62) Division of application No. 11/381,982, filed on May 5, 2006.

(51) Int. Cl.
B05D 3/00      (2006.01)
B05D 5/12      (2006.01)
B05D 3/10      (2006.01)

(52) U.S. Cl. ............... 427/331; 252/500; 257/E21.036; 257/E21.314; 264/5; 264/29.1; 423/445 B; 424/489; 429/309; 429/317; 430/315; 430/396; 445/49; 445/50; 445/51; 427/77

(58) Field of Classification Search ............... 427/77
See application file for complete search history.

(56) References Cited

U.S. PATENT DOCUMENTS

| | | | |
|---|---|---|---|
| 6,549,431 B2 | 4/2003 | Odell et al. | |
| 2002/0125805 A1 | 9/2002 | Hsu | |
| 2002/0175618 A1 | 11/2002 | Lee et al. | |
| 2003/0170287 A1* | 9/2003 | Prescott | 424/423 |
| 2004/0038614 A1 | 2/2004 | Chang et al. | |
| 2004/0090172 A1 | 5/2004 | Ide et al. | |
| 2004/0195950 A1 | 10/2004 | Ryu et al. | |
| 2005/0212394 A1 | 9/2005 | Lin et al. | |
| 2005/0269928 A1 | 12/2005 | Kim et al. | |
| 2006/0103287 A1 | 5/2006 | Tsuei | |
| 2006/0108907 A1 | 5/2006 | Sano | |
| 2007/0013287 A1 | 1/2007 | Huang et al. | |
| 2007/0259128 A1 | 11/2007 | Parsapour | |

OTHER PUBLICATIONS

Hinds et al., "Aligned Multiwalled Carbon Nanotube Membranes", Science 303, 62 (2004).*

Busta et al. ("Field emission from teepee-shaped carbon nanotube bundles", J. Vac. Sci. Technol. B 23(2), Mar./Apr. 2005, Published Apr. 6, 2005).*

(Continued)

*Primary Examiner*—Michael Kornakov
*Assistant Examiner*—Alexander Weddle
(74) *Attorney, Agent, or Firm*—Frommer Lawrence & Haug LLP; Bruce E. Black

(57) ABSTRACT

A method for preparation of carbon nanotubes (CNTs) bundles for use in field emission devices (FEDs) includes forming a plurality of carbon nanotubes on a substrate, contacting the carbon nanotubes with a polymer composition comprising a polymer and a solvent, and removing at least a portion of the solvent so as to form a solid composition from the carbon nanotubes and the polymer to form a carbon nanotube bundle having a base with a periphery, and an elevated central region where, along the periphery of the base, the carbon nanotubes slope toward the central region.

5 Claims, 5 Drawing Sheets

OTHER PUBLICATIONS

Busta et al, ("Field emission from teepee-shaped carbon nanotube bundles", Vacuum Nanoelectronics Conference, 2004. IVNC 2004. Technical Digest of the 17th International, Published Jul. 11-16, 2004).*

Busta, H. et al., "Field emission from teepee-shaped carbon nanotube bundles," J. Vac. Sci. Technol. B 23(2), Mar./Apr. 2005, pp. 676-679.*

"Effects of Post Treatment on the Field Emission Properties of CNTs Grown by ECR-CVD", Lee et al., Diamond & Related Materials 15 (2006) pp. 854-858 (Available on line Jan. 20, 2006).

"Elongation of Vertically Well-aligned Carbon Nanofiber Bundles and Their Field Emission Characteristics", by Kim et al., Current Applied Physics 6 (2006) pp. 766-771 (Available online Jun. 8, 2005).

Moon, et al, 2005. "Spindt tip composed of carbon nanotubes." J. Vac. Sci, Technol, B 23(5): 1964-1969.

Busta, H. et al., "Field emission from teepee-shaped carbon nanotube bundles," J. Fac. Sci. Technol. B 23(2), Mar./Apr. 2005, pp. 676-679.

Official Communication, U.S. Appl. No. 11/381,982, mailed Jan. 19, 2010; 8pgs.

* cited by examiner

CARBON NANOTUBE ARRAYS FOR FIELD ELECTRON EMISSION AND METHODS OF MANUFACTURE AND USE

This is a divisional of U.S. patent application Ser. No. 11/381,982, filed May 5, 2006, which is hereby incorporated in its entirety by reference.

FIELD OF THE INVENTION

This invention relates to carbon nanotube arrays for use in field emission devices (FEDs), and methods of preparation and use thereof.

BACKGROUND OF THE INVENTION

Carbon nanotubes are hexagonal networks of carbon atoms forming seamless tubes with each end capped with half of a fullerene molecule. They were first reported in 1991 by Sumio Iijima who produced multi-layer concentric tubes or multi-walled carbon nanotubes by evaporating carbon in an arc discharge. Carbon nanotubes (CNTs) have been found to possess exceptional electronic and mechanical properties, making them excellent candidates for applications relating to nanotube composite materials, nanoelectronics, sensors, and cold electron sources. CNTs can be utilized individually or as an ensemble to build a variety of devices. For instance, individual nanotubes have been used as tips for scanning probe microscopy and as mechanical nano-tweezers. Ensembles of nanotubes have been used for field emission based flat-panel displays, and it has been suggested that bulk quantities of nanotubes may be used as a high-capacity hydrogen storage media. The electronic behavior of CNTs is determined by their structure, i.e., nanotube diameter, length, and chirality. Thus, the precise control of CNT structural elements is critical for many electronic applications, especially for the development of field emission devices (FEDs).

FEDs are devices that capitalize on the movement of electrons. A typical field emission device includes at least a cathode, emitters, and an anode spaced from the cathode. A voltage is applied between the cathode and the anode causing electrons to be emitted from the emitters. The electrons travel in the direction from the cathode to the anode. These devices can be used in a variety of applications including, but not limited to, microwave vacuum tube devices, power amplifiers, ion guns, high energy accelerators, free electron lasers, and electron microscopes, and in particular, flat panel displays. Flat panel displays can be used as replacements for conventional cathode ray tubes. Thus, they have applications in television and computer monitors.

SUMMARY OF THE INVENTION

The method of the present invention for fabricating a plurality of carbon nanotube bundles hereof comprises:
  forming a plurality of carbon nanotubes on a substrate;
  contacting the carbon nanotubes with a polymer composition comprising a polymer and a solvent; and
  removing at least a portion of the solvent so as to form a solid composition from the carbon nanotubes and the polymer to form a carbon nanotube bundle having a base with a periphery, and an elevated central region; wherein, along the periphery of the base, the carbon nanotubes slope toward the central region.

The carbon nanotube arrays fabricated using the methods of the present invention hereof comprise:

a plurality of carbon nanotubes, the carbon nanotubes disposed on a substrate, and the bundle having a base with a periphery, and an elevated central region; wherein, along the periphery of the base, the nanotubes slope toward the central region.

In certain embodiments, the carbon nanotube arrays of the present invention further comprise,
  a carbon nanotube bundle having a first axis substantially perpendicular to a substrate, and
  each nanotube in the bundle having a second axis;
  the bundle further comprising an outer portion and an inner portion;
  the second axis of each nanotube within the outer portion being substantially perpendicular to the first axis, and
  the second axis of each nanotube within the inner portion being substantially parallel to the first axis.

The carbon nanotube arrays made in accordance with the methods of present invention can be used in field emission devices (FEDs). The CNT arrays may also be employed in other mechanical and electronic applications including, but not limited to, the manufacture nanoelectronic sensors, switches, cold cathode ion gauges, and portable X-ray devices The field emission devices made in accordance with certain embodiments of the present invention comprise:
  a cathode;
  an anode;
  a carbon nanotube array disposed on the cathode, the carbon nanotube array comprising;
  a plurality of carbon nanotube bundles, each bundle comprising a plurality of carbon nanotubes disposed on a substrate; and each bundle having a base with a periphery, and an elevated central region;
    wherein, along the periphery of the base, the nanotubes slope toward the central region.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1A:
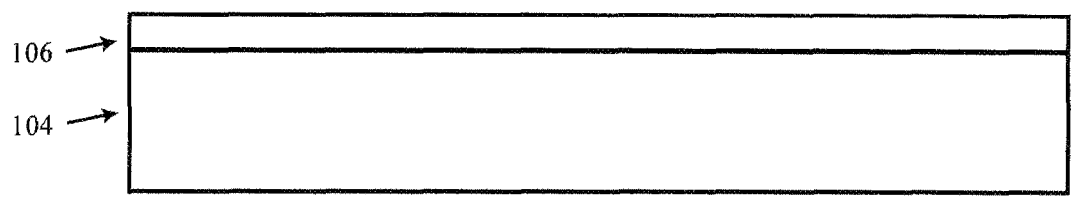
FIGS. 1A-1D illustrate schematic cross-sectional views of steps in part of a first embodiment of a process for the formation of a carbon nanotube bundle comprising a plurality of CNTs, according to the invention.

The invention is directed to carbon nanotube (CNT) bundles and arrays of CNT bundles wherein the surface area at the top of at least one bundle has been significantly reduced as compared to CNT bundles manufactured using conventional methods. The invention also relates to the methods of manufacture of the CNT bundles and arrays and to field emission devices (FEDs) comprising the CNT arrays.

Field emission results from the extraction of electrons from a solid by tunneling through the surface potential barrier under the application of a strong electric field. Above a threshold value and below a saturation value, the emitted current is generally dependent on the local electric field, E, at the emitting surface and the workfunction of the solid, $\phi$. According to the Fowler-Nordheim model, there is a generally exponential-like dependence of emitted current on the local electric field and workfunction; as a result, a small variation of the shape or the environment of the emitter strongly impacts the emitted current.

In many instances, in order for the number of electrons tunneling through the surface barrier to become significant, the electric field is relatively high, for example, on the order of 3 V/nm or more. To reach such a high field, practitioners often take advantage of the field amplification effect. Because electric field lines are concentrated around a sharp object, a decrease in the radius of curvature of an emitter may result in an increase in field amplification.

Carbon nanotubes are excellent candidates for field emission due to their low work function and high aspect ratios (the length to radius ratio).

Although not wishing to be bound by any particular theory, it is thought that a distance between carbon nanotubes ranging from 1-2 times the tube height can increase emitted current density. Practically, however, it has proven difficult to construct such a CNT array on a substrate due to difficulties relating to the patterning, growth, and intrinsic properties of CNTs. For example, the high aspect ratio of a CNT makes it a formidable task to grow an individual straight tube vertical to the substrate. Therefore, an array consisting of vertically aligned CNT bundles has become a compromise. The utilization of CNT bundles allows for relative readiness in emitter construction and enhanced operating efficiency.

Carbon nanotubes can be produced by methods such as arc-discharge, laser ablation or chemical vapor deposition (CVD). The first two methods typically rely on evaporating carbon atoms from solid carbon sources at a very high temperature. The CVD process involves heating a catalyst material to a high temperature in a reactor and flowing a hydrocarbon gas through the reactor for a period of time. Several parameters in nanotube CVD growth include the hydrocarbon species in the gas, the catalyst, and the reaction temperature.

In one embodiment, the cathode plane for a cold-cathode field emission device (FED) includes a substrate having a top layer of a material that emits electrons when subjected to an external electric field. For at least some FED applications, it is desirable to directly grow the CNTs onto the cathode substrate. One example of a method of generating carbon nanotubes on a surface involves catalytic growth via chemical vapor deposition (CVD). A catalyst layer is evaporated or sputtered on a substrate, the substrate is loaded into a reaction chamber, and feed gas is introduced at elevated temperatures. Preferably, decomposition of the feed gas occurs only at the catalyst sites, thus reducing amorphous carbon generation in the process. Decomposed carbon molecules assemble into nanotubes at the catalyst nanoparticle sites. Advantageously, catalyst nanoparticles can be patterned on a substrate lithographically to realize nanotube growth at intentional locations. For example, the growth of nanotubes can be caused to originate at a site of electrical connections or of mechanical significance. This method results in formation of bundles of nanotubes with a high population (site) density.

Field emission properties of nanotubes, including the field enhancement factor and current density, are often dependent on the site density of the CNT deposit. These properties may suffer at high densities due to, for example, field screening effects and field penetration. Techniques such as e-beam lithography and nanoimprint lithography have been employed for exact placement of individual nanotubes that are separated at pre-determined distances. However, these methods involve use of sophisticated equipment and are typically costly.

An aligned CNT bundle can be grown with varying sizes on different substrates. Although not wishing to be bound by any particular theory, it is thought that non-bonding interactions between CNTs allow for individual nanotubes to become associated with one another. As a consequence, the bundle remains macroscopically vertically aligned throughout the growth process, resulting in an array composed of substantially vertical CNT bundles. Theoretically, it is desirable to grow CNT bundles of minimal size for use as, for example, FED emitters; however, it has proven difficult to achieve CNT alignment and high yield when the bundle size is small, e.g., a few microns or smaller. In many cases, CNT alignment can become difficult when length of the CNTs becomes large compared to the bundle size. On the other hand, a large bundle size allows for convenient growth of CNT arrays in high yield with a low cost of catalyst patterning on the substrate. Larger CNT bundles of high site density, however, often display field emission properties that are not acceptable for use in FEDs.

In accordance with one embodiment of the present invention, a method is provided to allow for enhanced field emission properties of a CNT bundle due to a reduction of field screening and field penetration effects. In addition, the method allows for the fabrication of CNT arrays of high quality growth and in high yield. In certain embodiments, these enhanced properties are a result of methods that reduce the area at the top of a CNT bundle (i.e., the bundle surface that is distal to the substrate). In accordance with these methods, a CNT bundle is treated with a material that significantly reduces the area at the top of the CNT bundles. By reducing the area at the top of the bundle, the field amplification factor of the bundle is enhanced. In certain preferred embodiments the CNT bundle is a large bundle with CNTs of high-site density. The size of a CNT can be determined, for example, by a lithographic patterning method. In one embodiment, a lower limit of the size of the CNT bundle is in the range of about 1 to 4 µm². In some embodiments, the lower limit for CNT site density is $10^8$ CNT/cm².

Figure 1B:
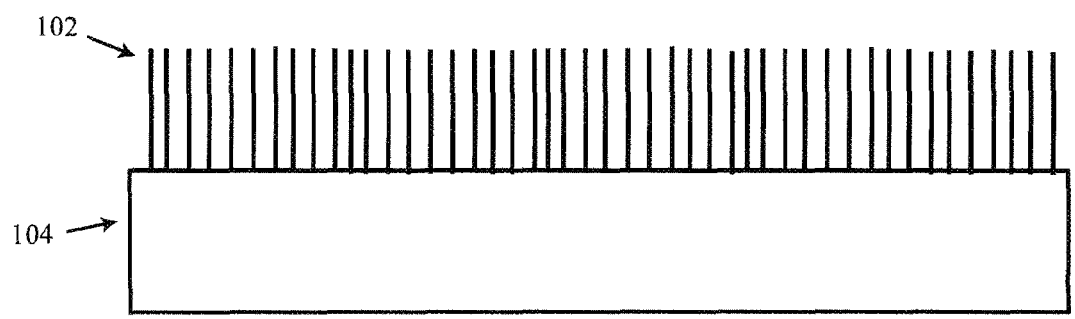

FIGS. 1A-D illustrate a portion of one embodiment of a process wherein an individual CNT bundle is treated with a material that significantly reduces the area at the top of the bundle. First, carbon nanotubes 102 are formed on a substrate 104 as illustrated in FIG. 1B. There are many methods that can be used to form carbon nanotubes and generally any of these methods is suitable. The carbon nanotubes are preferably formed so that they are generally aligned substantially perpendicular to the surface of the substrate. Thus, the overall CNT bundle has an axis that is substantially perpendicular to the substrate. In addition, the carbon nanotubes are, preferably, densely distributed on the substrate. For example, the site density of the carbon nanotubes can be at least $1\times10^8$ CNTs/cm$^2$ and, more preferably, at least $1\times10^9$ CNTs/cm$^2$. Preferably, the carbon nanotube bundle has an area of from about 20 to about 8000 µm$^2$.

In one example of a method for the formation of carbon nanotubes, an n-doped silicon substrate 104 is prepared. As illustrated in FIG. 1A, the top of the substrate 104 is coated with a thin layer 106 of a catalyst suitable for the preparation of the carbon nanotubes.

Figure 1C:
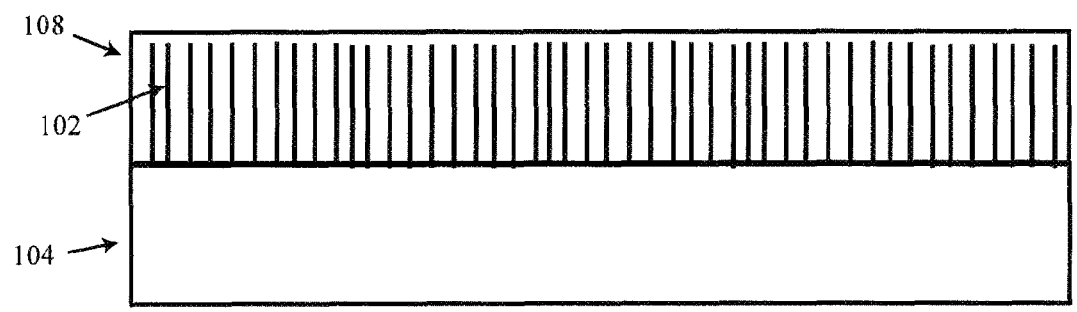

After the carbon nanotubes 102 are grown, a polymer composition 108 is provided over the nanotubes, as illustrated in FIG. 1C. This polymer composition includes at least a polymer and, optionally, a solvent. In some instances, the polymer may act as its own solvent. In other instances a solvent is provided with the polymer. Any method can be used for depositing the polymer composition on the carbon nanotubes including dip coating, spin coating, knife coating, spray coating, and the like. The solvent should not substantially solvate the carbon nanotubes or the substrate. Preferably, the polymer composition is sufficiently fluidic to permit uniform coverage of the carbon nanotubes.

Figure 1D:
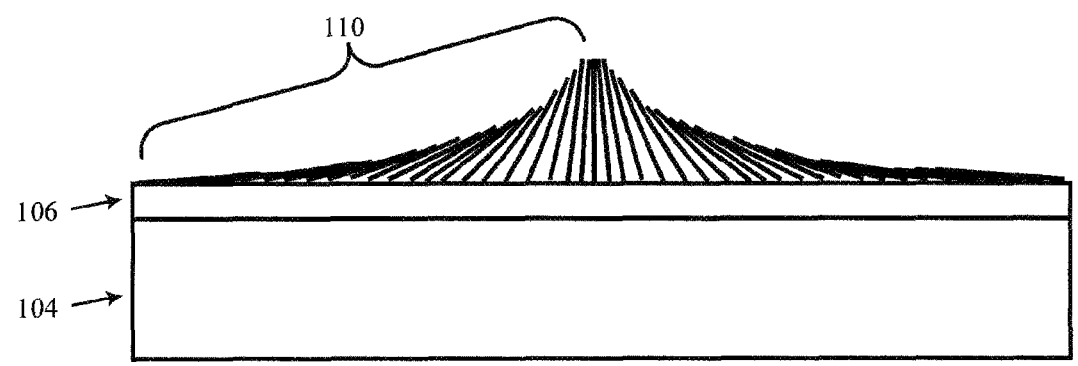

Once the polymer composition 108 is disposed over the carbon nanotubes 102, the solvent, if present, is at least partially removed, e.g., by evaporation, to produce a solid composition 110 of the carbon nanotubes and polymer, as illustrated in FIG. 1D. Preferably, substantially all of the solvent is removed. The structure of the solid composition 110 has a base with a periphery, and an elevated central region, wherein along the periphery of the base the nanotubes slope toward the central region.

In at least some embodiments, as the solvent is removed by evaporation, at least some of the nanotubes (or the regions of the nanotubes distal to the substrate) are pulled closer together to produce clusters of nanotubes with, for example, a conical structure when viewed from above. The polymer treatment method encompassed by this embodiment thus results in a tighter packing between the nanotubes and reduction in the overall size of the top of the CNT bundle to, in effect, form a bundle with a larger aspect ratio.

Without wishing to bound by any particular theory, it is thought that the shape of the solid composition 110 is a result of the evaporation of the polymer or polymer solution from the CNT bundle. The polymer or polymer solution may form a droplet that encompasses the CNT bundle, and as the droplet evaporates from its edges it acts to bend or pull at least some of the nanotubes towards the central region of the bundle. In some instances, based on the physics of evaporation, the nanotubes that reside in the outer portion of the bundle become substantially parallel with the substrate and the nanotubes that reside in the inner portion of the bundle remain substantially perpendicular to the substrate. The final shape of the solid composition 110 may be affected by the shape of the CNT bundle prior to treatment.

In an alternative embodiment, based on the physics of evaporation of particular solvents, or based on the size of the solvent droplet as compared to the bundle, evaporation may occur so as to pull at least some of the nanotubes toward the periphery of the base of the nanotube bundle. In this embodiment, at least some of the nanotubes may slope away from the central region of the bundle.

In certain embodiments, removal of the solvent may result in the removal of at least a portion of the CNTs from the substrate. In at least some cases, CNT removal by the polymer occurs along the perimeter of the bundle and thus results in a decrease in diameter (or width) of the base.

Figure 2A:
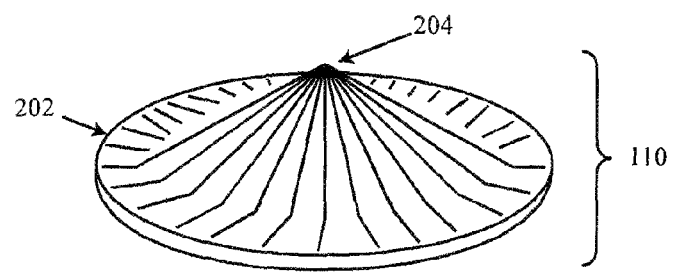
FIGS. 2A-2D illustrate schematic perspective views of several embodiments of carbon nanotube bundles, according to the invention.
Figure 2B:
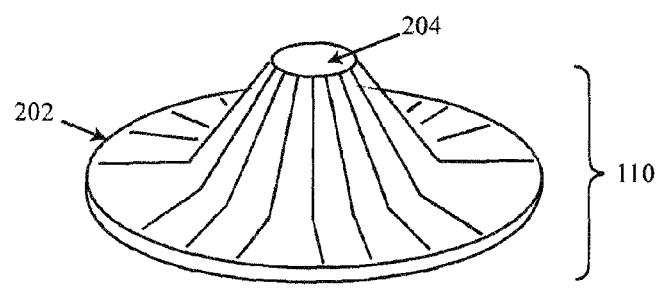
Figure 2C:
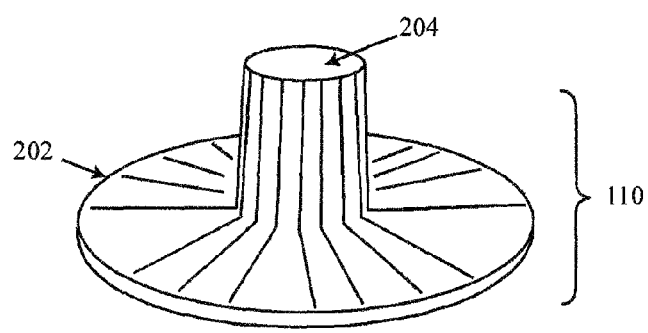
Figure 2D:
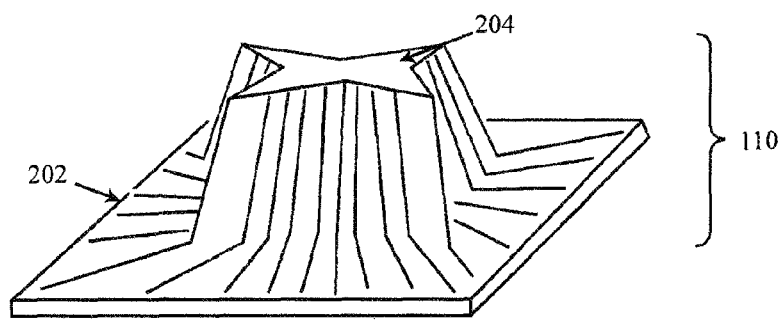
Figure 3A:
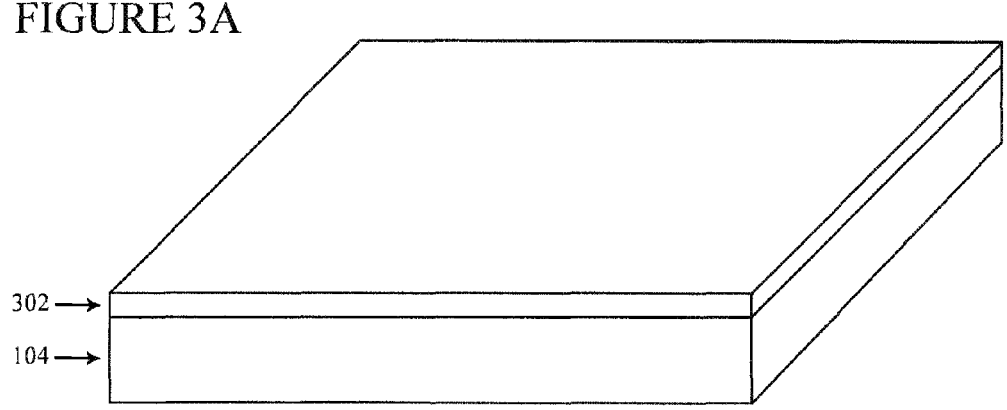
FIGS. 3A-3F illustrate schematic cross-sectional views of steps in part of a second embodiment of a process for the formation of a carbon nanotube array with a plurality of CNT bundles, wherein the array is further patterned with lithographic methods, according to the invention.
Figure 3B:
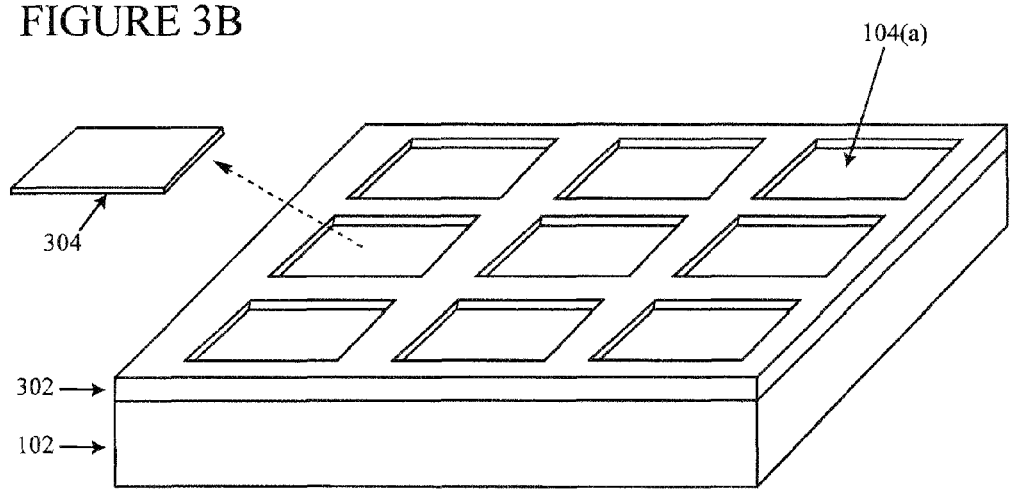
Figure 3C:
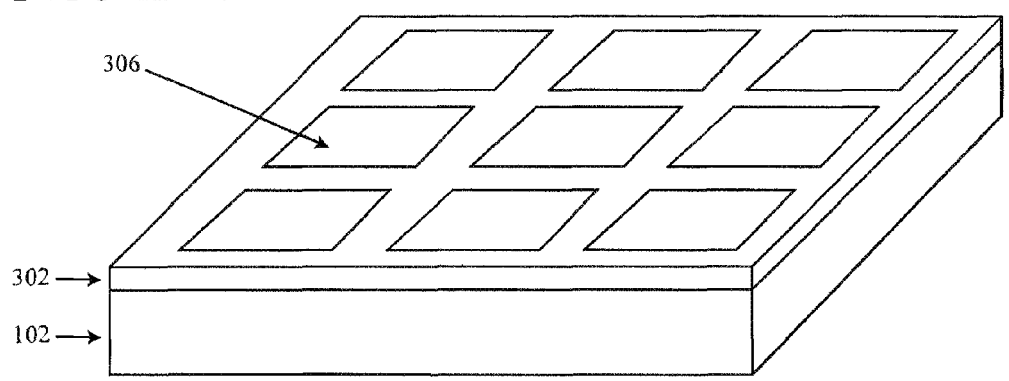
Figure 3D:
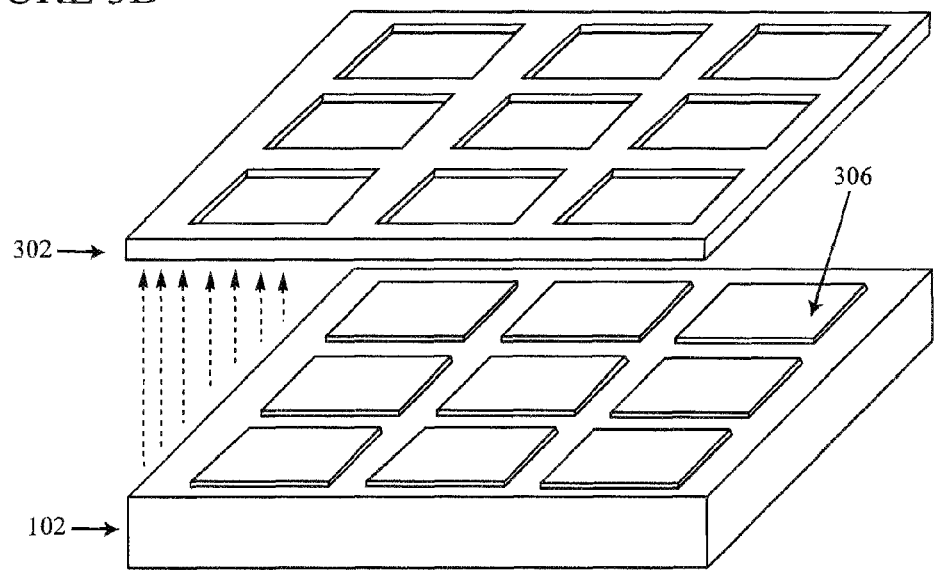
Figure 3E:
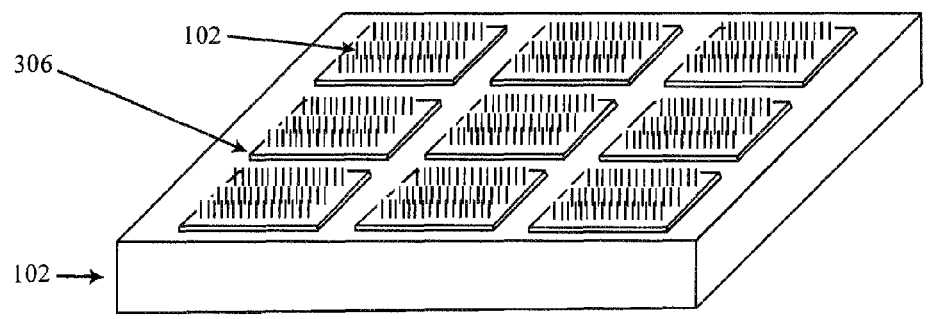
Figure 3F:
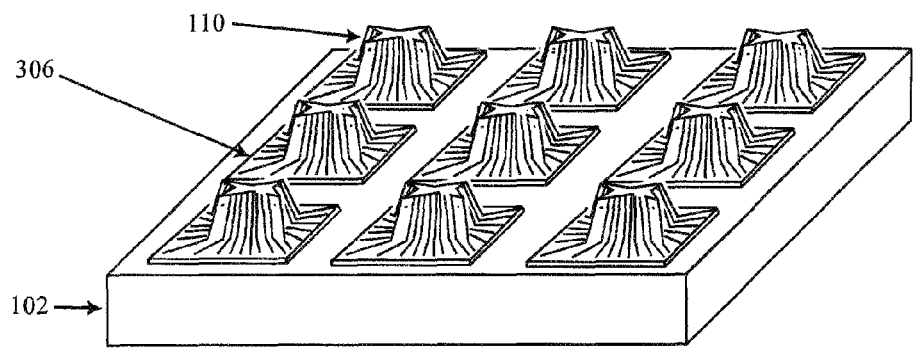

For example, as shown in FIGS. 2A-2D, circular bundles and square bundles can give rise to solid compositions with a conical (FIGS. 2A-2B) or a cylindrical structure (FIG. 2C), and a star structure (FIG. 2D) respectively. The final shape of the solid composition may also be affected by the ratio of the average height of the nanotubes to the overall area of the CNT bundle. Accordingly, as this ratio becomes larger, the outer portion of the CNT bundle wherein the nanotubes are substantially parallel to the substrate, in many cases, also becomes larger. With regard to a circular bundle, for example, as the ratio of nanotube height to bundle area increases, the shape of the elevated portion of the treated bundle may change from conical (FIG. 2B) to trapezoidal (FIG. 2C) to cylindrical (FIG. 2D).

Once the solid composition 110 has been formed, at least a portion (and preferably, all) of the polymer can be removed. In one embodiment, at least a portion of the polymer is removed by using a solvent that solvates the polymer and not the carbon nanotubes. The solvent can be dripped or otherwise poured over the treated CNT bundle or CNT array to remove the polymer or the bundle or array can be placed in the solvent. Upon removal of the at least a portion (and preferably, all) of the polymer, the nanotube bundle preferably maintains the geometrical structure associated with solid composition 110.

Additionally, or alternatively, the polymer (for use alone or in combination with the previously described methods), the CNT bundle or array can be heated in a furnace, preferably, in an inert atmosphere such as an argon atmosphere. The temperature of the furnace and the period for heating can vary. For example, the bundle or array can be heated in an 850° C. furnace for at least 30 minutes to remove residue of the polymer.

The term "carbon nanotube" refers to a hollow cylindrical article composed primarily of carbon atoms. For example, the nanotubes 102 can have a narrow dimension (diameter) of about 1-200 nm and a long dimension (length), where the ratio of the long dimension to the narrow dimension, i.e., the aspect ratio, is at least 5. In many CNTs, the aspect ratio is at least 10 and can be 100, 1000, 10,000, 100,000; 1,000,000 or more.

When used in the context of a CNT bundle, the axis of the long dimension of each individual CNT is described in relation to an axis perpendicular to the substrate onto which the CNT bundles are grown. The long dimension of each CNT can be substantially parallel to the substrate, substantially perpendicular to the substrate, or aligned at any angle in between parallel and perpendicular.

The carbon nanotubes of the invention can be either multi-walled nanotubes (MWNTs) or single-walled nanotubes (SWNTs). A MWNT, for example, includes several concentric nanotubes each having a different diameter. Thus, the smallest diameter tube is encapsulated by a larger diameter tube, which in turn, is encapsulated by another larger diameter nanotube. A SWNT, on the other hand, includes only one nanotube.

The terms "carbon nanotube bundle" or "bundle," as used herein, are synonymous and refer to a plurality of CNTs that occupy a certain area of substrate. Bundle size and shape are predetermined by the artisan based on, for example, the lithographic patterning of catalyst on the substrate. The terms "outer portion" or "perimeter" of the bundle, as used herein, are synonymous and refer to an area of the bundle comprising CNTs that are disposed along the outer edges of the bundle. The terms "inner portion" or "center" of the bundle, as used herein, are synonymous and refer to an area of the bundle comprising CNTs that are disposed within the central portion of the bundle. The size of the outer and inner portions are either defined by a width or a diameter depending on the shape of the CNT bundle. The outer and inner portion of the bundle can either be in direct contact with one another, or separated by an intermediate portion of the CNT bundle of varying width.

In a preferred embodiment, the width of the outer portion is from about 5 to about 100 μm, and the width of the inner portion is from about 1 to about 80 μm. In this context, when a circular bundle is used, the diameter and the width of the inner portion are synonymous.

It will be understood that the term "polymer" includes, but is not limited, to mixtures or other combinations of polymeric materials, as well as copolymers and the like. In addition to the polymer and solvent, the polymer composition can also include one or more additives, such as surfactants, plasticizers, antioxidants, filler, tackifiers, organic solvents, and the like.

Any polymer can be used in the polymer composition 108. Preferably, the polymer is soft and flexible, not brittle, upon removal of any solvent. Polymers with such characteristics often have a glass transition temperature that is no more than 25° C. or room temperature. More preferably, the polymer is glassy, tacky, and soft at room temperature or 25° C., upon removal of the solvent. In addition, the polymer is preferably soluble in water or an organic solvent that does not solvate the carbon nanotubes. Examples of suitable polymers include polyvinyl methyl ether (PVME), polyvinyl alcohol (PVA), polyvinylpyrrolidone (PVP), polymethylmethacrylate (PMMA), polystyrene (PS), and the like.

The term "substrate," as used herein, refers to the structure 104 upon which the nanotubes are disposed. In many instances, the substrate provides the mechanical support for the CNT. Preferably, a portion of or the entire substrate has a smooth and flat surface that is electrically conductive and does not react during the carbon nanotube growth process. The substrate can be, for example, a single crystal, polycrystalline, glassy or amorphous material whose surface is the surface on which the nanotubes are deposited or grown. The substrate can comprise one or more layers that may be structured to form an electronic architecture. In particular, an architecture may be constructed which allows each CNT structure of an array of CNT structures to be separately addressable electrically. The substrate can also contain a pattern which is either uniform or non-uniform. The pattern may include contacts formed and leading to the CNT structures. That is, the substrate may include a plurality of current paths on the substrate, each coupled electrically to a respective one or more of the CNT structures. The substrate is not comprised of materials that are reactive with the nanotubes, with any material used in the process for their preparation or with intermediates formed during the process.

In a preferred embodiment of the present invention, the substrate is made of semiconductor material such as Si or n-doped silicon, or an insulating material such as silica, glass, alumina, quartz, ceramic materials, mica, a synthetic resin, or graphite. Especially preferred in the practice of the present invention is n-doped Si in the form of an Si wafer.

The terms "catalyst," "catalytic metal," and "metal catalyst," as used herein, are synonymous, and refer to any material (e.g., a transition metal) that catalyzes the reaction of the carbon-containing feedstock to carbon nanotubes. Catalytic metals that are suitable for the practice of the method invention include, for example, any transition metal, transition metal complex, or transition metal alloy that, when exposed to the reaction chamber and feed gasses, aids in the formation of carbon nanotube structures on the substrate. The catalyst 106 can be deposited on the surface of the non-catalytic interlayer in the form of the active catalyst or in the form of a pre-catalyst. The pre-catalyst is a metal containing material that when treated, for example, by exposure to the high temperatures of the reaction chamber, is converted to an active catalyst capable of promoting CNT growth on the substrate.

In a preferred embodiment of the present invention, the catalyst is a transition metal selected from the group consisting of Fe, Co, Ni, Mo, Pd, and Pt, and complexes and alloys thereof. A particularly preferred metal catalyst for the practice of the present invention is metallic Fe.

As referred to herein "density" or "site-density" denotes units of CNT structures per centimeter squared (CNTs/cm$^2$). Site density relates the statistical spacing distance between individual CNT structures in an array. For example, a density of about $10^6$ CNTs cm$^{-2}$ corresponds to a statistical spacing distance between CNTs of about 10 micrometers (μm). In a preferred embodiment of the present invention, the CNTs disposed on the substrate have a high site-density.

The term "high site-density," as used herein, refers to a large number of CNT structures per centimeter squared (CNTs/cm$^2$). Typically a high site-density refers to a density of at least about $10^8$ CNTs/cm$^2$.

The term "reaction chamber," as used herein, refers to any apparatus that provides the reaction conditions for the growth of nanotube structures. In one embodiment of the present invention, the reaction chamber is a chemical vapor deposition (CVD) apparatus. In one example of a CVD process, gaseous mixtures of chemicals are dissociated at high temperature (for example, $CO_2$ into C and $O_2$) and some of the liberated molecules may then be deposited on a nearby substrate, with the rest pumped away. With regard to the growth of CNTs, the CVD apparatus provides an atmosphere of a source gas that provides the carbon atoms necessary for CNT growth. The CVD apparatus may also provide a promoter gas and a diluent gas to allow for an enhancement of the purity of the nanotubes grown. Examples of CVD methods include but not limited to thermal CVD, plasma enhanced CVD (PECVD), hot filament CVD (HFCVD), and synchrotron radiation CVD (SRCVD). In a preferred embodiment of the present invention the CVD apparatus is a thermal CVD apparatus.

A thermal CVD apparatus is typically heated to high temperature, e.g., from about 650 to about 1000° C., to allow for the thermal decomposition of a source gas. Examples of growing nanotubes are discussed below. It will be recognized, however, that there are many methods of making carbon nanotubes and these methods are, in general, suitable for use in the present invention. The source gas of the present invention can be, for example, a saturated or unsaturated; linear, branched, or cyclic hydrocarbon, or mixture of hydrocarbons, that are gas or vapor phase at the temperatures at which they are contacted with the catalyst substrate material (reaction temperature). Other exemplary carbon-containing gases include carbon monoxide, oxygenated hydrocarbons such as acetone and methanol, aromatic hydrocarbons such as toluene, benzene and naphthalene, and mixtures of the above. A rate of deposition of carbon on the catalyst material at elevated temperatures will depend on factors including the partial pressures of the carbon-containing gases. Preferred carbon source gases include methane, propane, acetylene, ethylene, benzene, or mixtures thereof. In an especially preferred embodiment, the carbon source gas for the synthesis of low to medium-site density CNTs is ethylene.

The promoter gas is a substance that is a gaseous compound at the reaction temperatures, and preferably comprises a non-carbon gas such as hydrogen, ammonia, ammonia-nitrogen, hydrogen sulfide, or mixtures thereof. The promoter gas may be useful to reduce the formation unwanted allotropes of carbon, such as graphite, and the deposition of such materials on the substrate surface. The promoter gas of the present invention may be diluted by mixing it with a diluent gas, which are primarily unreactive, oxygen-free gases, such as for example, helium, nitrogen, argon, neon, krypton, xenon, or combinations thereof. For the CVD reaction process of the present invention, hydrogen is preferred for reaction temperatures maintained at less than about 720° C., while for higher temperatures (greater than or equal to about 720° C.), the promoter gas is chosen from ammonia, hydrogen, ammonia-nitrogen, or any combination thereof. The promoter gas can be introduced into the reaction chamber (e.g. a thermal CVD apparatus) at any stage of the reaction process. Preferably, the promoter gas is introduced into the reaction chamber either prior to or simultaneously with the carbon source gas. In a preferred embodiment, the promoter gas is hydrogen and the diluent gas is argon.

The methods of the present invention can yield either multi-walled or single-walled nanotubes. For promoting multi-walled carbon nanotube growth, exemplary CVD methods employ a growth temperature typically in the range of 650-750° C. with ethylene as the carbon-containing gas. Carbon-containing gases for promoting the growth of single-walled carbon nanotubes include methane, ethylene, acetylene and carbon monoxide. SWNT are usually grown at a temperature in the range of 850-950° C.

The methods of the present invention can provide carbon nanotube arrays wherein the growth of each individual nanotubes is either catalyzed from the base of the nanotube, or is catalyzed from the tip of the nanotube. If the mechanism of nanotube growth occurs from the base of the nanotube (catalysis at the catalyst pad surface), the nanotube structure will likely be attached to the surface of the catalyst pad. However, if the mechanism of nanotube growth occurs from the tip of the nanotube (catalysis distal from the catalyst pad surface), the nanotube structure will likely be attached to the surface of the substrate. Depending on nanotube catalysis factors such as, for example, the identity of the catalyst (i.e., choice of metal), catalyst pad thickness, growth conditions (e.g., furnace temperature, reaction time), the nanotubes can be grown from the nanotube base, from the nanotube tip, or both. In certain embodiments of the present invention the CNT structures will be formed over the exposed surface of the catalytic metal layer. Although initial CNT formation occurs, in most cases, at the catalytic metal surface, the point of attachment of the CNT (catalyst surface or substrate surface) will depend on the mechanism or catalysis (base growth or tip growth).

The reaction time in the preferred methods of the invention can be varied depending on the length of the nanotubes desired, with longer times generally resulting in longer nanotubes. For example, under one set of reaction conditions, reaction of the substrate in the thermal CVD furnace for 1 minute will provide CNT arrays wherein the individual nanotubes have an average length of about 30 μm. A 60 minute reaction time provides for an array wherein the individual nanotubes have a length of about 250 μm. In one embodiment, the preferred reaction times utilized in the methods of the present invention are from about 1 to about 10 minutes to provide nanotubes with a length of from about 10 μm to about 70 μm.

Generally, the diameter and length of the carbon nanotubes will depend on the process parameters (e.g., temperature, time, ratio of gases, etc.) and gases used in growing the nanotubes. In addition, some nanotube formation techniques grow single-walled nanotubes and others techniques grow multi-walled nanotubes. In one example, multi-walled carbon nanotubes were grown at 700° C. for 25 minutes on a silicon substrate with iron catalyst layer. Different mixtures of gases were used including a mixture containing 100 sccm (standard cubic centimeters per minute) hydrogen and 690 sccm ethylene and a second mixture containing 400 sccm hydrogen, 400 sccm ethylene, and 400 sccm argon. The resulting carbon nanotubes had an average height of about 150 micrometers and a diameter in the range of 10 to 40 nm.

In a preferred embodiment, the average diameter of the CNTs in the arrays fabricated using the methods of the present invention is from about 10 nm to about 150 nm.

Thus, through the control of both the average height and average diameter of the CNTs grown from the methods described herein, arrays of CNTs can be fabricated with the large aspect ratios necessary for electronic applications such as, for example, field emission devices (FEDs).

In certain embodiments of the present invention, the CNTs are disposed on the substrate as a plurality of CNT bundles to form a CNT array. Preferably, each CNT bundle has a size of from about 20 $\mu m^2$ to about 8000 $\mu m^2$. The terms "array" and "CNT array," as used herein, are synonymous and refer to a plurality of CNT bundles that are attached to the substrate material proximally to one another. For the purposes of the various embodiments of this invention, the CNT array comprises the substrate, the plurality of CNT bundles grown thereon, and optionally, a plurality of separate catalyst pads whereupon the CNT bundles are grown. Treatment of the CNT array with a polymer or polymer solution and subsequent removal of at least a portion of the solvent thus yields a CNT array comprising plurality of solid compositions 110 (See FIG. 1D). The CNT array of the present invention can be used as a cold cathode in the fabrication of field emission devices and particularly for field emission displays.

In a further embodiment of the present invention lies a method for forming patterns of CNT bundles (i.e., a CNT array) on the substrate using lithographic methods. The lithographic methods described herein provide for the precise placement and patterning of catalytic sites onto the surface of the substrate. Thus, the CNT arrays fabricated using the methods herein can be grown in alignment with, inter alia, current paths on the substrate. In one example, patterns of CNT bundles are grown from a plurality of catalyst pads disposed upon the substrate. The plurality of catalyst pads can be formed via lithography through the use of, for example, a resist material.

The terms "resist" and "resist material," as used herein, are to be understood to encompass any material suitable to protect an underlying surface during a process treatment. Thus, a resist may be any organic or inorganic chemical substance or compound which can be blanket-deposited and patterned for feature definition. Both positive and negative resists can be used. The resist can have process selectivity relative to the underlying material, such as significantly differing etch-rates, or it may act as a shielding element, for instance, to protect the underlying surface from material deposition or ion bombardment. In one embodiment, resist development produces a negative pattern of pads with pre-determined dimensions. These pads can then, for example, be used to control the areas of catalyst deposition on the interlayer to ultimately control defined areas on the substrate where CNT growth is initiated.

In one embodiment of the present invention, the resist material is a photoresist material suitable for use with any photolithography method. Photolithography can include masking techniques and other techniques, such as mirrored laser illumination. As one example, a photoresist material is a viscous polymer resin (solution) containing some photochemically active polymer (PAC), which is typically rendered insoluble or soluble, relative to a wash solution, by exposure to light. Using a photoresist, a selected pattern can be imaged on a substrate. Areas of a positive photoresist not exposed to electromagnetic radiation may be removed by a washing process. Alternatively, a negative photoresist method may be employed, wherein only the areas of the photoresist material that have been exposed to electromagnetic radiation are removed by washing. As examples, a liquid resist such as is used in semiconductor manufacture or a film resist such as is used in the manufacture of printed circuit boards may be used for this purpose.

In a preferred embodiment, the resist material is deposited on the surface of the substrate prior to the deposition of the catalyst onto the substrate. The resist layer is aligned with a mask with an appropriate pattern and the exposed areas of the resist layer are treated with, for example, a UV light source. The resist layer is then developed and the exposed areas removed to provide a pattern of negative pads with pre-determined dimensions, where the substrate surface is exposed. The catalyst layer is then deposited on the exposed substrate surface. Finally, the remaining resist layer is removed through etching. The final product has catalyst pads over a uniform and continuous substrate surface.

FIGS. 3A-3F illustrate a portion of one embodiment of a process to form a patterned array of a plurality of CNT bundles using lithography. First, a resist layer 302 is formed on the surface of the substrate 104 and the resist layer is patterned using, for example, a mask and exposing the resist layer to, for example, a UV light source. The resist layer 302 is treated to remove, for example, the exposed portions of the resist layer 304. Next, a catalytic layer is formed on exposed surfaces 104(a) of the substrate 104 to form a plurality of catalyst pads 306. The remaining resist layer 302 is then removed and the catalyst/substrate material is used to form a plurality of CNT bundles 102 onto the surface of the plurality of catalyst pads 306. Alternatively, the plurality of CNT bundles 102 can be formed on the plurality of catalyst pads 306 prior to the removal of the remaining resist layer 302. Finally, using the methods set forth herein, the array of CNT bundles are treated with a polymer or polymer solution to form an array of CNT solid compositions 110. Removal of at least a portion of the polymer material provides an array of CNT bundles wherein the surface area of the tops of at least one bundle has been significantly reduced.

In another embodiment lies a method for the manufacture of a field emission device (FED) comprising a CNT-based cold cathode fabricated using the methods of the present invention. For example, the CNT array comprising CNT bundles of the present invention can be used as the cold cathode. Without wishing to be bound by any particular theory, if the top area of the CNT bundles is reduced the number of CNTs that emit electrons under electric field is also minimized, field emission efficiency can be enhanced. Examples of FEDs include a diode-based architecture consisting of a cathode and an anode; a triode based architecture consisting of a cathode, and anode, and a gate electrode; or a tetrode based architecture further comprising an electrode between the gate electrode and the anode to be used as a focusing grid. The FED can be fabricated using methods and materials known in the art, for example those disclosed in "Materials for Field Emission Displays" (Burden, A. P. *International Material Reviews* 46:213-231 (2001)) which is incorporated herein by reference in its entirety.

Figure 4:
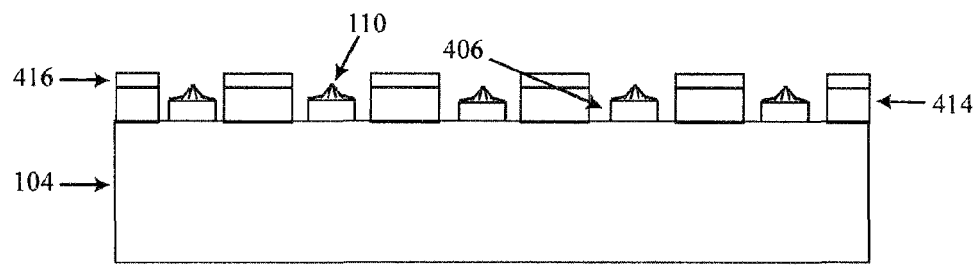
FIG. 4 illustrates a schematic cross-sectional view of one embodiment of a field emission device comprising a carbon nanotube array with a plurality of CNT bundles, according to the invention.
Figure 5:
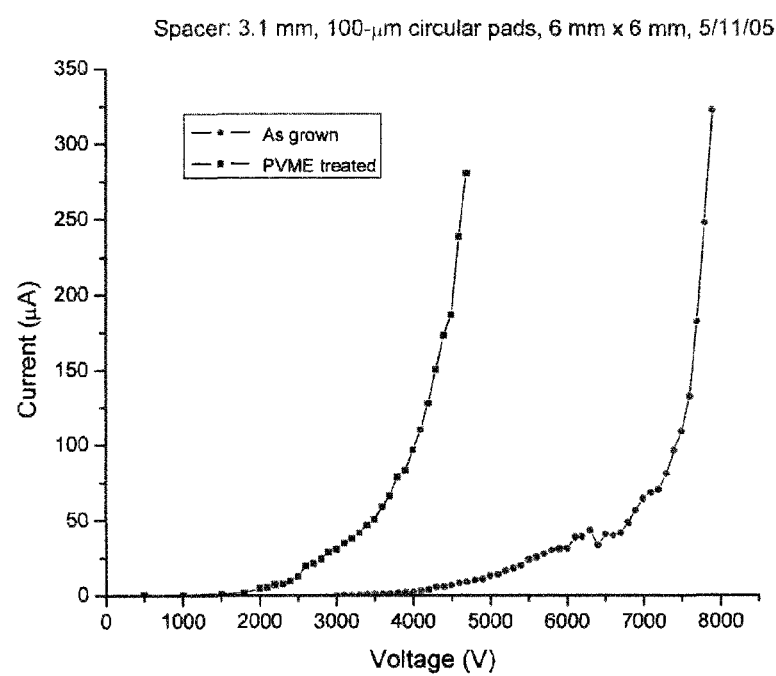
FIG. 5 shows a plot of the current density vs. macroscopic electrical field for a PVME treated CNT array with a bundle shape similar to that illustrated in FIG. 2B (as compared to an identical CNT array not treated with PVME). The CNT array was 6 mm×6 mm, comprising of a plurality of circular CNT pads, each 100 µm in diameter.

FIG. 4 illustrates a portion of one embodiment for the cathode array of a field emission device manufactured using certain cold cathode arrays of the invention. The cathode array comprises 1) a cold cathode array, comprising a substrate 104, a plurality of catalyst pads 406, and a plurality of CNT bundles 110; 2) an optional insulator layer 414 on the exposed surface of the interlayer 104; and 3) an optional gate electrode layer 416 on the exposed surface of the insulator layer 414. The cathode array of FIG. 4, can then be coupled with an anode using conventional methods in the art as, for example, disclosed in "Materials for Field Emission Displays" (Burden, A. P. *International Material Reviews* 46:213-231 (2001)).

For the manufacture of field emission devices and displays, it is fairly standard practice to use methods, for example photolithography methods, for forming patterns of the metal cathode and catalyst. Thus, utilizing the lithography methods set forth herein for the manufacture of FEDs is well within the scope of the embodiments of the present invention.

In an alternative embodiment, CNT bundles of medium to low site-density can be used in the practice of the methods of the present invention. Arrays comprising at least one CNT bundle of medium to low-site density can be manufactured, for example, by depositing a non-catalytic metal interlayer between the substrate and the catalyst as described in "Method For Controlled Density Growth Of Carbon Nanotubes," U.S. application Ser. No. 11/381,981, filed on May 5, 2006, the entire disclosure of which is incorporated by reference herein in its entirety.

Without further elaboration, it is believed that one skilled in the art can, using the preceding description, utilize the present invention to its fullest extent. The following examples are, therefore, to be construed as merely illustrative, and not limitative of the remainder of the disclosure in any way whatsoever.

EXAMPLES

Materials and Methods

Polyvinyl methyl ether (PVME; 50% aqueous solution) was purchased from Aldrich and directly used without further purification. 1.2% PVME and 4.7% solutions were prepared by diluting 50% PVME with deionized water to the required concentrations. In order to improve its wetability on a surface, a few drops of 10% Triton X100 was added to the resultant solution.

Silicon wafers were soaked in a Nochromix (from Aldrich) sulfuric acid bath for at least one day to remove contaminants before use.

Photoresist PR-1000A, photoresist developer RD6, and photoresist remover RR4 were products of Futurrex, Inc.

All exemplary CNT bundles and arrays were analyzed by Scanning Electron Microscopy (SEM).

Example 1

Lithographic Methods for the Formation of CNT Arrays

Patterning of a silicon wafer followed the sequence of spin-coating a photoresist on the wafer, thermally treating the treated wafer at 100° C. for 10 min, exposing the treated wafer to UV light through a mask on a Tamarack Mask Aligner, developing the wafer with the Futurrex photoresist developer to form photoresist patterns on the wafer, rinsing the wafer with deionized water, blowing the wafer dry with a compressed air stream, evaporating iron (2 to 20 nm, typically about 5 nm) onto the surface of the wafer using a Semicore E-Beam Evaporator, immersing the iron coated wafer into the Futurrex photoresist remover to dissolve the photoresist patterns, spraying deionized water onto the wafer to remove any solid residues, and finally blowing compressed air to dry the wafer. In the end, a wafer containing iron patterns was obtained.

Example 2

Lithographic Methods Using a Negative Photomask

A cleaned wafer was evaporated with a thin layer of iron with a thickness of about 5 nm on a Semicore E-Beam Evaporator, and then spin-coated with Futurrex photoresist. After exposure to UV light through a negative mask, the wafer was developed with the Futurrex photoresist developer. After the developed wafer was rinsed with deionized water and dried, it was immersed into 0.2% hydrochloric acid to etch off the exposed iron layer, leaving intact the iron layer protected by the photoresist patterns. The resulting wafer was subsequently rinsed with deionized water and dried by blowing with compressed air. The photoresist patterns were removed by dipping the wafer into a Futurrex photoresist remover or acetone or N-methylpyrrolidone. After rinsed with deionized water, the wafer was dried by blowing it with compressed air stream.

Example 3

Growth of CNT Bundles

The photolithography methods set forth in Examples 1 and 2 provided silicon wafers patterned with iron catalyst. The silicon wafers consisted of iron catalyst pads of either circular or square shape. The diameter of the circular pads were 100 µm or 5 µm and the square pads were 100×100 µm.

The growth of CNT arrays from the patterned iron catalyst described above was performed on a FirstNano EasyTube 1000 furnace. The growth took place at 700° C. in the presence of a mixed gas flow consisting of 400-sccm hydrogen, 400-sccm ethylene, and 400-sccm argon. The length of the CNTs was controlled by varying growth time.

Example 4

Polymer Treatment of a CNT Array

One method developed provided both for a reduction of the surface area of the top of the CNT bundles and a reduction of the number of CNTs contributing to field emission. Polymer treatment of an array of CNT bundles was performed by carefully dripping 1.2% PVME solution onto the array until it was completely covered by the solution. As soon as the array was in contact with PVME solution, all the CNT bundles were immediately soaked up with the solution, evolving large number of tiny air bubbles. The array was placed on a horizontal surface and allowed to dry at room temperature. During the drying process, water continuously evaporated off, causing the volume of the solution to shrink. When the solution shrank to the point where the solution could no longer form a continuous liquid membrane covering up the array, it broke down to droplets, each of which covered up a single CNT bundle. As the solution continued to evaporate, the droplets shrank further toward the center of the bundles. The surface tension of the solution pulled the CNTs on the outer portion of the bundle toward the center during this drying process. Drying under these conditions resulted in a bundle wherein the CNTs within the inner portion of the bundle remained substantially perpendicular to the substrate while the surrounding CNTs leaned toward it in a radial fashion. The PVME-treated silicon chip containing the CNT array was then soaked for 15 minutes in deionized water two times to remove PVME from the CNT pattern. The chip was then allowed to dry at room temperature or dried under a heat gun.

An alternative drying process was also employed, wherein the silicon wafer containing a CNT array was tilted to let the excess PVME solution to run off of the surface before it was dried in a horizontal position by blowing mild warm air toward it using a heat gun.

Example 5

Polymer Treatment of CNT Bundles of Varying Height

Examples 5A-C show results of three arrays treated with PVME as set forth in Example 4. Prior to PVME treatment, all of the three arrays were comprised of circular bundles of 100 µm diameter as described in Example 3.

Example 5A

Using the methods described in Example 3, the patterned silicon wafer was allowed to react in the furnace for 1 minute to afford an array of CNT bundles of approximately 10 µm in height. After PVME treatment, SEM showed that a narrow (~10 µm width) ring was formed by the collapsed CNTs at the perimeter, which corresponded to the length of the CNTs constituting the bundle. A circular plateau (~80 µm diameter) composed of the top portions of the CNTs was surrounded by the ring at the perimeter. At the center of the plateau was a small tip formed by the CNTs at the center of the bundle which remained substantially parallel to the substrate due to the support from the surrounding CNTs.

Example 5B

Using the methods described in Example 3, the patterned silicon wafer was allowed to react in the furnace for 3 minutes to afford an array of CNT bundles of approximately 30 µm in height. After PVME treatment, SEM showed a ring along the perimeter had increased in size (~25 µm width) while the circular plateau formed by the top portion of the CNTs significantly decreased in size (~30 µm width) as compared to example 5A. The tip at the center of the bundle became more prominent and rose significantly above the level of the circular plateau.

Example 5C

Using the methods described in Example 3, the patterned silicon wafer was allowed to react in the furnace for 10 minutes to afford an array of CNT bundles of approximately 70 µm in height. After PVME treatment, SEM showed that the CNTs occupying the inner portion of the bundle covered a much smaller area (~25 µm diameter) as compared to Examples 5A and 5B. In this example, the surrounding CNTs collapsed to the surface of the substrate to form a ring at the perimeter of ~35 µm in width.

Patents, patent applications, publications, product descriptions, and protocols which are cited throughout this application are incorporated herein by reference in their entireties for all purposes.

The present invention is not limited in scope by the specific embodiments described herein. Indeed, various modifications of the invention in addition to those described herein will become apparent to those skilled in the art from the foregoing description. Such modifications are intended to fall within the scope of the appended claims. It is further to be understood that all values given in the foregoing examples are approximate, and are provided for purposes of illustration.

What is claimed is:

1. A method of making a carbon nanotube bundle, the method comprising:
    forming a plurality of vertically aligned carbon nanotubes on a substrate to provide the carbon nanotube bundle;
    contacting the carbon nanotubes with a polymer composition comprising a polymer and a solvent;
    bending or pulling at least some of the carbon nanotubes along the periphery towards the central region of the bundle by evaporating at least a portion of the solvent so as to form a solid composition from the carbon nanotube bundle and the polymer having a base with a periphery, and an elevated central region; wherein, along the periphery of the base, the carbon nanotubes slope toward the central region; and removing substantially all of the polymer from the bundle.

2. The method of claim 1, wherein forming a solid composition comprises removing a majority of the solvent from the polymer composition.

3. The method of claim 1, wherein forming a solid composition comprises removing substantially all of the solvent from the polymer composition.

4. The method of claim 1, wherein the glass transition point of the polymer is no more than 25° C.

5. The method of claim 4, wherein the polymer is polyvinyl methyl ether (PVME).

* * * * *